Jan. 8, 1963     S. H. CREED     3,072,162
ROTATABLE CORING KNIFE
Original Filed Aug. 1, 1956
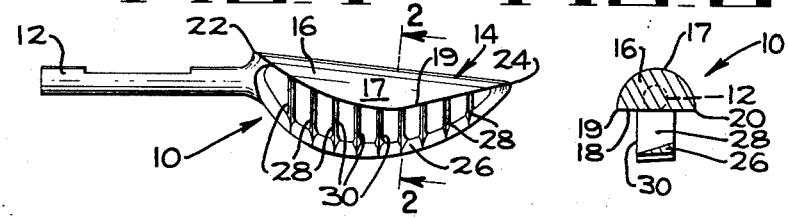
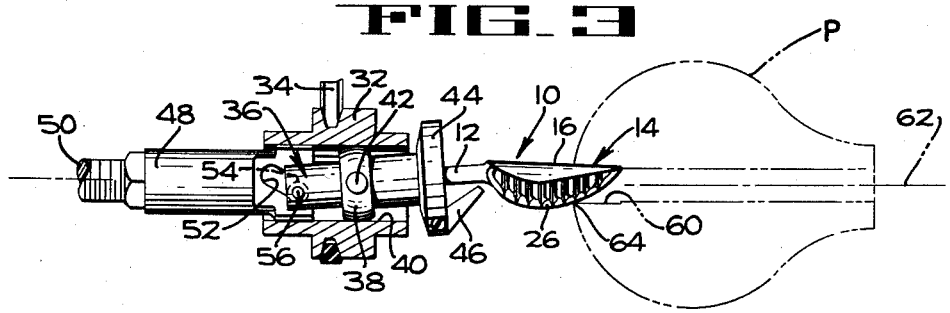
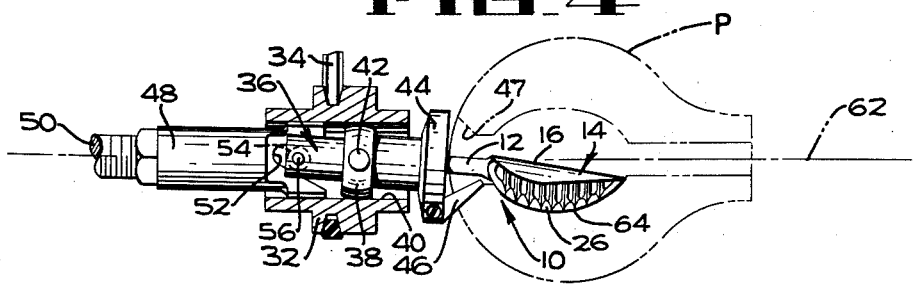
INVENTOR
SHERMAN H. CREED
BY
ATTORNEY

United States Patent Office 3,072,162
Patented Jan. 8, 1963

3,072,162
ROTATABLE CORING KNIFE
Sherman H. Creed, San Jose, Calif., assignor to FMC Corporation, a corporation of Delaware
Original application Aug. 1, 1956, Ser. No. 601,541, now Patent No. 2,969,098, dated Jan. 24, 1961. Divided and this application Feb. 16, 1959, Ser. No. 793,457
4 Claims. (Cl. 146—52)

This invention relates to apparatus for the preparation of fruit, and more particularly to an improved device for the coring of fruit such as pears, while such fruit is in a substantially whole condition.

This application is a division of copending application U.S. Serial No. 601,541, filed August 1, 1956, now Patent No. 2,969,098, and entitled "Fruit Preparation Machine."

In the preparation of pears and similar fruit for use in fruit cocktail, it is the usual procedure to cut each fruit in half for removal of the core, and to then dice the fruit halves. When this procedure is followed, a considerable portion of the fruit is lost in the form of unusable fragments.

It is therefore an object of the present invention to provide a device for removing the core of a fruit while the latter is in substantially whole condition.

Another object of the invention is to provide an improved knife for coring pears and similar fruit.

These and other objects of the present invention will become apparent from the following description taken in connection with the accompanying drawings, in which:

FIG. 1 is a side elevation of the fruit coring knife of the invention.

FIG. 2 is a vertical section taken along the lines 2—2 of FIG. 1.

FIG. 3 is a side elevation of the fruit coring knife of FIGS. 1 and 2 on a reduced scale, mounted in a first operational position for coring a pear, a portion of the actuating mechanism for said knife being shown.

FIG. 4 is a view similar to FIG. 3, the knife being shown in a second operational position.

Referring to FIGS. 1 and 2, a fruit coring knife 10 is shown, which is particularly adapted for use in a fruit preparation machine, such as that disclosed in applicant's aforementioned copending application Serial No. 601,541. The knife 10 has a generally cylindrical shank 12 and a body portion 14. The body portion 14 includes a longitudinally extending guide member 16 having a generally semi-cylindrical outer surface 17 and a longitudinally curved underside or ledge 18. Longitudinally curved marginal side edges 19 and 20 of the guide member 16 converge at the rearward end 22 of the surface 17 and at the forward end 24 thereof. A wedge-shaped blade 26 is disposed in spaced relation to the guide member 16, said blade being curved or bowed outward longitudinally and being integrally connected with the guide member 16 at the rearward end 22 and at the forward end 24 of the guide surface.

Mounted between the guide member 16 and the blade 26 are a plurality of longitudinally spaced blades 28. Each of the blades 28 has a cutting edge 30 which faces in the same direction as the cutting edge of the wedge-shaped blade 26.

Referring to FIGS. 3 and 4, the knife 10 is shown mounted in position for engagement with a pair P to be cored. The mounting means for the knife 10 are those disclosed in the aforementioned copending application. The knife is supported by a pulley 32 which is rotatable by a belt 34 connected to drive means (not shown). The knife 10 is mounted in the pulley 32 by means of a pivot member 36 having a central flange 38 of segmental spherical shape disposed in pivoting engagement with the internal wall of a bore 40 extending longitudinally through the pulley 32. A pivot rod 42 passes transversely through the bore 40, being supported at its ends in holes (not shown) in the wall of the pulley 32. The pivot rod 42 extends through and is secured to the central flange 38 of the pivot member 36, and thus mounts said pivot member for pivoting movement relative to the pulley 32. A flange 44 carried by the pivot member 36 adjacent the forward thereof supports a calyx trimming blade 46.

The pivot member 36 is pivoted during the coring operation by means of an extension member 48 adjustably secured to the threaded end of a push rod 50. The extension member 48 is formed at its forward end with an inclined camming groove 52, which receives a tubular roller 54 passing transversely through a groove (not shown) formed in the rear end of the pivot member 36. The roller 54 is maintained in position by a pin 56 which extends through the roller and is disposed in aligned openings (not shown) in member 36 on opposite sides of the groove. Reciprocation of the push rod 50 and the extension member 48 will result in pivotal movement of the pivot member 36, and consequently of the knife 10.

During the coring operation, the knife 10 is constantly rotated in a clockwise direction as viewed in FIG. 2, rotation being imparted thereto by the pulley 32 driven by belt 34. The pear P (FIG. 3) is gradually moved into engagement with the knife 10 by any suitable means, such as that disclosed in the aforementioned copending application. When the pear engages the knife 10, the edge of the blade 26 adjacent the forward end of the knife begins to cut into the core. The outer surface 17 of the guide member 16 guides the pear as the latter is moved onto the knife. The ledge 18 intercepts and maintains the core material in position for cutting by the blades 28 after being cut by the blade 26. The outer surface 17 of the guide member 16 cooperates with the blade 26 as it cuts into the pear to form a small, generally cylindrical opening 60 that has a diameter equal to twice the distance between the axis of rotation 62 of the knife 10 and the edge portion 64 of the blade 26. When the pear engages the calyx trimming knife 46, a segmental conical recess 47 (FIG. 4) is formed in the butt end of the pear. The wedge-shaped blade 26 will thus cut a ribbon of material, which ribbon will in turn be cut into strips and fragments by the blades 28. The core material of the fruit so cut into strips and fragments will be readily separable from the fruit cubes during a separating operation performed after the fruit has been processed in a dicing machine.

When a pear becomes fully positioned on the coring knife 10, the actuating means for the push rod 50 moves the latter toward the right. The extension 48 is consequently moved into the position shown in FIG. 4, the roller 54 is as a result cammed into its position shown in FIG. 4, and the knife 10 is pivoted into a position in which there is an increase in the distance between the axis of rotation 62 of the knife and the edge portion 64 of the blade 26. In its pivoted position, the knife 10 upon rotation will cut out the entire core of the pear. After a predetermined cutting period, the extension 48 is returned to its position shown in FIG. 3, and the knife 10 is thus swung back to its initial pear-entry position.

From the foregoing description, it will be apparent that the present invention provides a coring knife that is capable of efficiently removing the core of a fruit such as a pear while the pear is in substantially whole condition. The unique construction of said knife makes possible the cutting and breaking up of the core into fragments that may be easily separated from the cubes of fruit which may be formed in other processing operations.

It will be understood that modifications and variations of the embodiment of the invention disclosed herein may be resorted to without departing from the scope of the concepts of the present invention. Therefore, the scope of the invention should be limited only by the scope and proper interpretation of the claims appended hereto.

What I claim as new and desire to protect by Letters Patent is:

1. A rotatable cutter for the preparation of fruit, comprising an elongated, longitudinally curved cutting blade, a longitudinally extending guide member disposed opposite said blade and having longitudinally curved side edges converging at the forward and rearward ends of said longitudinal cutting blade, and a plurality of transverse blades disposed between said longitudinal blade and said guide member.

2. A knife for coring fruit comprising an elongate longitudinally curved member providing an outwardly bowed cutting blade, and an elongate guide extending longitudinally of said blade at the concave side thereof and meeting said blade at one end forming a point therewith for penetrating said fruit, said guide having a rounded guide surface facing away from said blade to engage the surface defining the core cavity in a fruit.

3. A coring knife rotatable about a longitudinal axis comprising a blade bowed outwardly from said longitudinal axis having a cutting edge facing perpendicular to the plane in which said blade is bowed and a plurality of transverse blades projecting inwardly toward said axis from said bowed blade, said transverse blades having cutting edges facing the same direction as said cutting edge of said outwardly bowed blade.

4. A coring knife rotatable about a longitudinal axis comprising a longitudinally curved cutting blade having a cutting edge facing normal to the plane of curvature, and a plurality of transverse blades spaced longitudinally along said curved cutting blade projecting inwardly therefrom toward said longitudinal axis and perpendicular thereto, said transverse blades having cutting edges facing the same direction as said cutting edge of said longitudinally curved cutting blade.

References Cited in the file of this patent

UNITED STATES PATENTS

| | | |
|---|---|---|
| 1,761,639 | Northcutt | June 3, 1930 |
| 2,040,458 | Bacon | May 12, 1936 |
| 2,075,750 | Pease | Mar. 30, 1937 |
| 2,415,747 | Krilow | Feb. 11, 1947 |
| 2,556,528 | Elkington | June 12, 1951 |
| 2,614,324 | Greenidge | Oct. 21, 1952 |
| 2,820,496 | Keifer | Jan. 21, 1958 |